Dec. 4, 1928.
J. G. G. COULLIE ET AL
1,693,775
FISHPLATE
Filed July 8, 1927
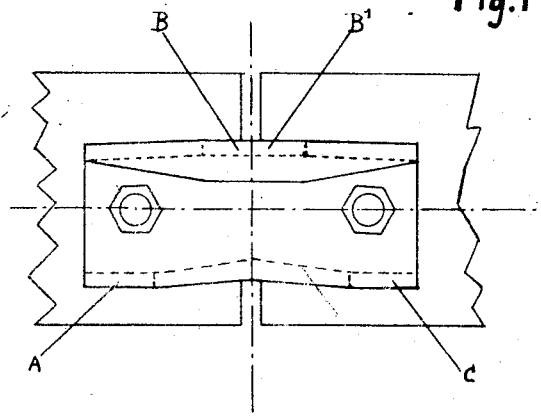
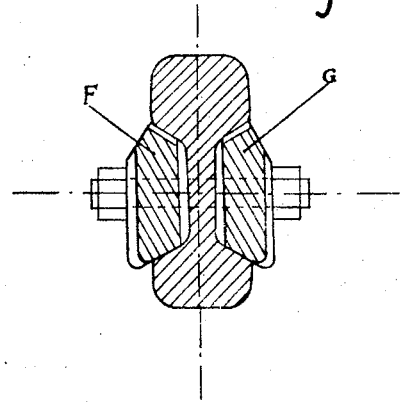
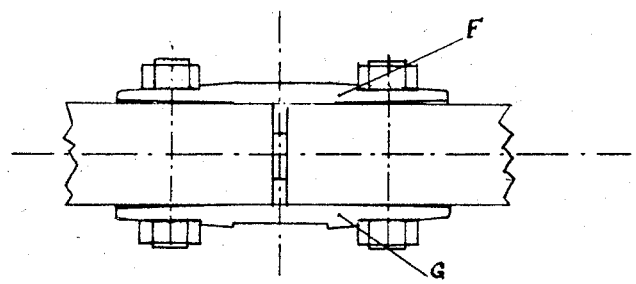
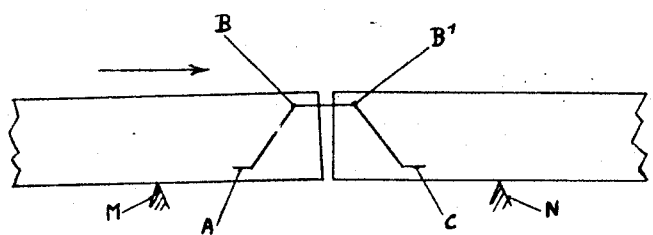
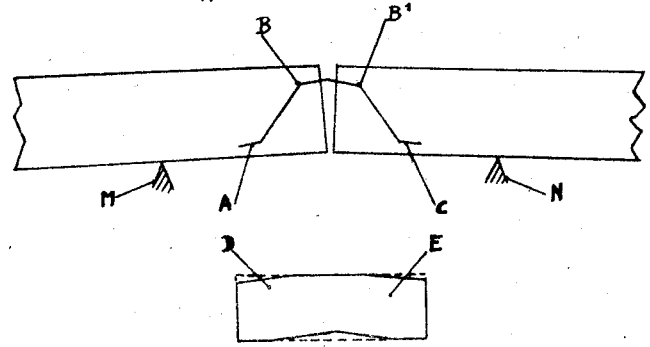
J. G. G. Coullie
and J. L. Cabis
INVENTORS
By: Marks & Clerk
ATTYS.

Patented Dec. 4, 1928.

1,693,775

UNITED STATES PATENT OFFICE.

JEAN GABRIEL GEORGES COULLIE AND JEAN LOUIS CADIS, OF BORDEAUX, FRANCE.

FISHPLATE.

Application filed July 8, 1927, Serial No. 204,380, and in France July 9, 1926.

Our improved fish plate is adapted to provide a vertical movement of the adjacent ends of the two rails by the mere action of the wheels running over the joint.

A form of execution is shown by way of example on accompanying drawings. Fig. 1 is a side view, Fig. 2 a view from above and Fig. 3 a cross section. Figs. 4, 5 and 6 are explanatory diagrams.

Our fish plate has a substantially inverted V shape (Fig. 6) and is not deformable. It bears against the lower flange of the two rails towards its outer lower ends A and C (Figs. 1 and 4) and against the top flange towards the middle of its top edge, the points A and C being inside the points M and N corresponding to the ties supporting the rails on either side of the joint (Fig. 4). When the fish plate is fastened tightly against the rails its wedging action causes the joint against which bears the line B $B_1$ to rise. This is allowed by the fact that the fish plate bears against the rail at each point A, B, $B_1$, C over a very small surface. This result may even be increased if the opposite edges of the rail flanges against which the fish plate bears are slightly sloping as shown diagrammatically on an exaggerated scale on Fig. 5.

In practice our fish plate appears preferably as a short ordinary two-bolt rectangular fish plate the top corners of which are cut away and the lower edge is hollowed out in its middle (Fig. 6).

The fish plates F and G of the joint are secured (Figs. 3 and 4) against the ends of the rails either by a clamping part surrounding the joint or else by bolts such as the two bolts shown on accompanying drawings.

Our improved fish plate prevents the joint from falling as in fact it causes it to rise at each passage of a wheel. It prevents during the said passage the ends of the rails from beating against the fish plate as in the usual fishings where some play always arises after a very short time. This absence of play in our improved fish plate prevents also the rails from being submitted to deformation and shocks caused by the passage of a train, as is the case with the usual fish plates. Our improved fish plates give by reason of the possible rising of the joints a minimum resistance to the expansion of the rails under the effect of heat. Finally, the permanency of the mechanical contact between the different parts ensures a permanent electric contact between them which allows the usual electric bonds used in electric railways to be dispensed with.

The two bars F and G which form the fish-plate are wedged against the flanges of the rails when pressed together by the bolts. This causes, as stated, the joint to rise slightly. When it is submitted to a load, the joint is lowered with reference to its normal raised position, as the bars are only held through one bolt to each rail and through a small part of the small bearing surfaces, they may pivot at this moment with reference to the rails and as they are rigidly connected together they are wedged more tightly against the said rails. When the load has rolled off, the fish-plate though still wedged against the rail flanges bears against them with less force and allows them to return to their raised position. This modification of the wedging of the plate together with its angular movement with reference to the rails affords a very smooth rolling of the load and a minimum wear of the parts occurring only on the bearing surfaces. This wear can be easily compensated by screwing down the bolts tighter without any modification in the working.

The expansion of the rail is greatly facilitated by the slight unwedging which occurs before the arrival of the wheel over the joint. The moving of the rails is prevented to a great extent by the fact that the further rail tightly secured to the fish plate is no longer subject to shocks from the arriving wheels. The only possible remaining shocks due to the gap between the rails are considerably reduced by the cat's back provided by our improved fishing.

What we claim is:

A rail joint comprising two abutting rails, two similar fish-plates consisting each of an inverted V-shaped vertical member placed on either side of the rails, said fish plates having no contact with the web of the rails and bearing only on the sloped inner faces of the top flanges, through very small bearing surfaces extending on either side of the joint, and on the upper faces of the lower flanges through two other very small surfaces provided at their lower outer ends and one bolt only adapted to secure said fish plates to each rail and disposed substantially towards the middle of the sloping line connecting the upper bearing surface with the corresponding lower bearing surface.

In testimony whereof we have affixed our signatures.

JEAN GABRIEL GEORGES COULLIE.
JEAN LOUIS CADIS.